United States Patent
Swern

[11] 3,824,381
[45] July 16, 1974

[54] AIRCRAFT CONTROL SYSTEM USING INERTIAL SIGNALS

[75] Inventor: Frederic L. Swern, Succasunna, N.J.

[73] Assignee: The Bendix Corporation, Teterboro, N.J.

[22] Filed: May 25, 1972

[21] Appl. No.: 256,897

[52] U.S. Cl...... 235/150.22, 235/150.27, 244/77 A, 244/77 D
[51] Int. Cl.......................... B64c 13/20, G06g 7/78
[58] Field of Search....... 235/150.2, 150.22, 150.25, 235/150.26, 150.27; 340/25–27; 343/108 R, 105 LS; 73/178 R; 244/77 A

[56] References Cited
UNITED STATES PATENTS

| | | | |
|---|---|---|---|
| 3,058,699 | 10/1962 | Osder | 343/108 R |
| 3,223,362 | 12/1965 | Doniger | 343/108 R |
| 3,291,421 | 12/1966 | Kramer et al. | 343/108 R |
| 3,327,973 | 6/1967 | Kramer et al. | 343/108 R |
| 3,417,945 | 12/1968 | Reynolds et al. | 343/108 R |
| 3,467,344 | 9/1969 | Kramer et al. | 343/108 R |
| 3,604,908 | 9/1971 | Loome et al. | 235/150.22 |
| 3,652,835 | 3/1972 | Devlin et al. | 235/150.22 |
| 3,697,022 | 10/1972 | Autechaud et al. | 343/108 R |
| 3,743,221 | 7/1973 | Lykken et al. | 235/150.22 |

Primary Examiner—Felix D. Gruber
Attorney, Agent, or Firm—Anthony F. Cuoco; S. H. Hartz

[57] ABSTRACT

A system using inertial signals for controlling an aircraft to capture a radio beam. The system uses a shaped beam error signal and the inertial signals to provide a steering signal. The steering signal is filtered and the capture mode is engaged when the filtered signal has a polarity that causes the craft to fly parallel to the beam, whereupon the craft follows a path which is exponential with respect to the beam and symmetrical about beam center.

14 Claims, 4 Drawing Figures

FIG. 3

LATERAL FLIGHT GEOMETRY

LONGITUDINAL FLIGHT GEOMETRY

AIRCRAFT CONTROL SYSTEM USING INERTIAL SIGNALS

BACKGROUND OF THE INVENTION

1. Field of the Invention

This invention relates generally to aircraft control systems and particularly to systems for controlling the craft to capture a radio beam. More particularly, this invention relates to systems for controlling the craft to capture a radio beam without a large inherent increase in spurious signal sensitivity.

2. Description of the Prior Art

In order to improve the capability of an aircraft control system to utilize signals from glidepath and localizer beams, the glidepath or localizer coupler is divided into two modes: 1. the capture mode and; 2. the tracking mode. The function of the capture mode is to steer the aircraft from an allowable initial condition to a path close to that of the beam. The function of the tracking mode is to minimize beam deviations.

Beam capture is a dynamic maneuver; that is, aircraft accelerations will be high and design limits must be implemented to insure comfortable flight. Minimum susceptibility to noise effects and minimum time to engage the tracking mode are desirable control system performance factors. Minimum overshoot of the beam increases safety of operation and pilot confidence, and hence is also a desirable system peformance factor.

The use of beam error signals alone in systems of the type described results in acceptacle performance but severely degrades noise response and control stick activity. In previous control systems, a glideslope beam error signal is summed with beam integral and pitch attitude signals. Capture mode engagement occurs at a fixed beam error. In systems using these parameters, system stability is good but large inherent beam overshoots occur. In other systems a beam error signal is summed with a washed out pitch attitude signal. Beam overshoot is reduced but system stability is degraded. Similarly, systems using localizer beam error signals and heading signals for system damping result in like disadvantages.

SUMMARY OF THE INVENTION

This invention contemplates an aircraft control system responsive to radio beams and including beam couplers for effecting lateral and longitudinal control of the craft to capture the beams. The system uses a shaped beam error signal and pitch attitude and normal acceleration (inertial) signals to generate a longitudinal steering signal, and uses a shaped beam error signal and heading error and roll attitude (inertial) signals to generate a lateral steering signal. The steering signals are filtered for maximum noise elimination during the beam capture mode, with the mode being engaged when the steering signal has a polarity to cause the craft to fly parallel to the beam.

One object of this invention is to provide a system using radio beam signals and inertial signals for lateral and longitudinal control of an aircraft to capture the beam.

Another object of this invention is to capture the beam asymptotically from either side without susceptibility to wind gusts or other disturbances.

Another object of this invention is to provide a system of the type described which is relatively insensitive to offsets in sensors which provide the inertial signals.

Another object of this invention is to provide a system of the type described which has the capability to capture radio beams without a large inherent increase in spurious signal sensitivity.

Another object of this invention is to provide a system of the tyoe described which features maximum noise filtering during the beam capture mode.

Another object of this invention is to engage the beam capture mode when the filtered steering signal has a polarity so as to cause the aircraft to fly parallel to the radio beam.

Another object of this invention is to set filter time constants for acceptable wind gusts and wind shear performance.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 2:
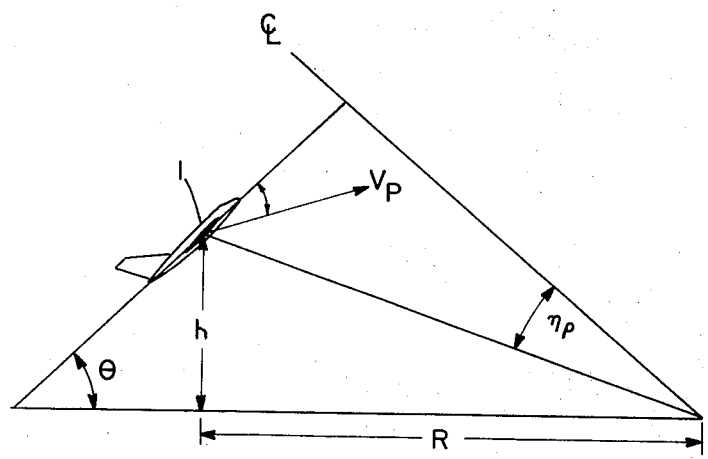
FIG. 2 is a diagrammatic representation showing longitudinal flight geometry.
Figure 3:
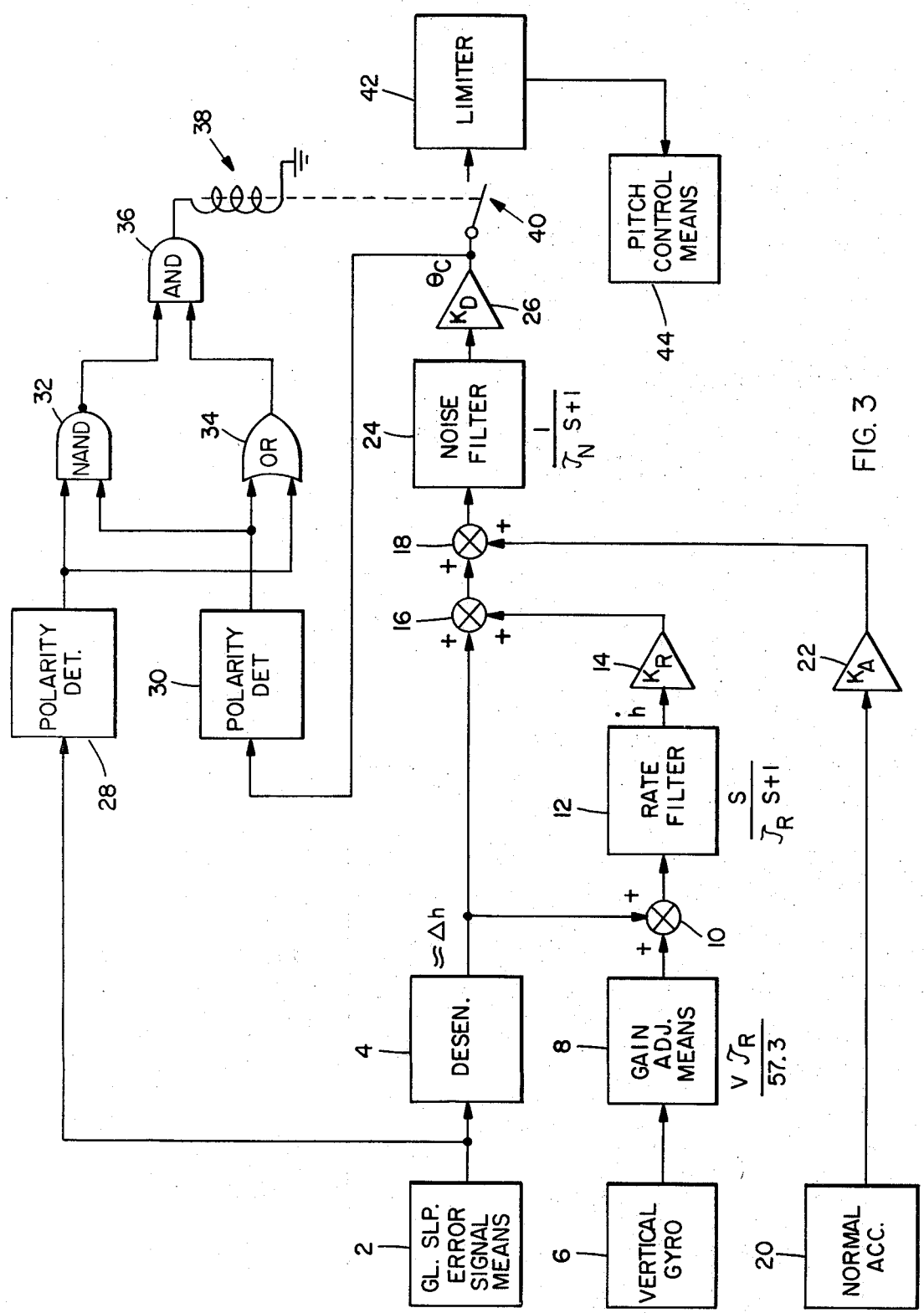
FIG. 3 is a block diagram showing an on-board system for controlling the longitudinal flight of the craft.

With reference first to FIG. 3, a system for controlling the longitudinal flight of an aircraft 1 (FIG. 2) includes a glideslope beam error signal means 2 for providing a glideslope beam error signal which is applied to a conventional type signal desensitizer 4. Signal desensitizer 4 provides a signal proportional to the change in altitude of the aircraft which is designated as $\Delta h$.

A vertical gyro 6 provides a signal corresponding to the pitch attitude of aircraft 1. The pitch attitude signal is applied to a gain adjusting means 8 having a constant gain factor $\nu \tau_R/57.3$ as will be hereinafter explained. The signal from gain adjusting means 8 is applied to a summing means 10 and summed thereat with signal $\Delta h$ from desensitizer 4.

The signal from summing means 10 is applied to a rate filter 12 having a transfer function $S/\tau_R S + 1$. Rate filter 12 provides a signal $\dot{h}$ corresponding to pitch attitude rate. Signal $\dot{h}$ is applied to an amplifier 14 having a constant gain $K_R$.

Signal $\Delta h$ from desensitizer 4 and the signal from amplifier 14 are applied to a summing means 16 and summed thereby. The signal from summing means 16 is applied to a summing means 18. A normal accelerometer 20 provides a normal acceleration signal which is applied to an amplifier 22 having a constant gain $K_A$. The signal from amplifier 22 is applied to summing means 18 and summed thereby with the signal from summing means 16. It will be understood that the normal acceleration signal is inertially referenced and is thus the inertial signal heretofore referred to.

The signal from summing means 18 is applied to a noise filter 24 having a transfer function $1/\tau_N S + 1$. The signal from filter 24 is applied to an amplifier 26 having a gain constant gain $K_P$. Amplifier 26 provides a glideslope steering signal $\theta_c$.

The signal from glideslope error signal means 2 is applied to a conventional type polarity detector 28 and signal $\theta_c$ from amplifier 26 is applied to a like polarity detector 30. The signal from polarity detector 28 is applied to NAND gate 32 and to an OR gate 34 and the signal from polarity detector 30 is applied to NAND gate 32 and to OR gate 34. NAND gate 32 and OR gate 34 provide signals which are applied to an AND gate 36. Gates 32, 34 and 36 operate as an "exclusive OR" combination so that when the polarity of signal $\theta_c$ as compared to the polarity of the signal from glideslope error signal means 2 is such as to cause aircraft 1 to fly parallel to the beam, gate 36 provides a signal which energizes a relay 38 connected by suitable mechanical means to a normally open switch 40. Energized relay 38 closes switch 40 to connect amplifier 26 to a signal limiter 42.

The signal from limiter 42 is applied to a pitch control means 44 which may be a conventional type servo system including aircraft control surface feedback means for controlling the pitch attitude of the craft.

Figure 4:
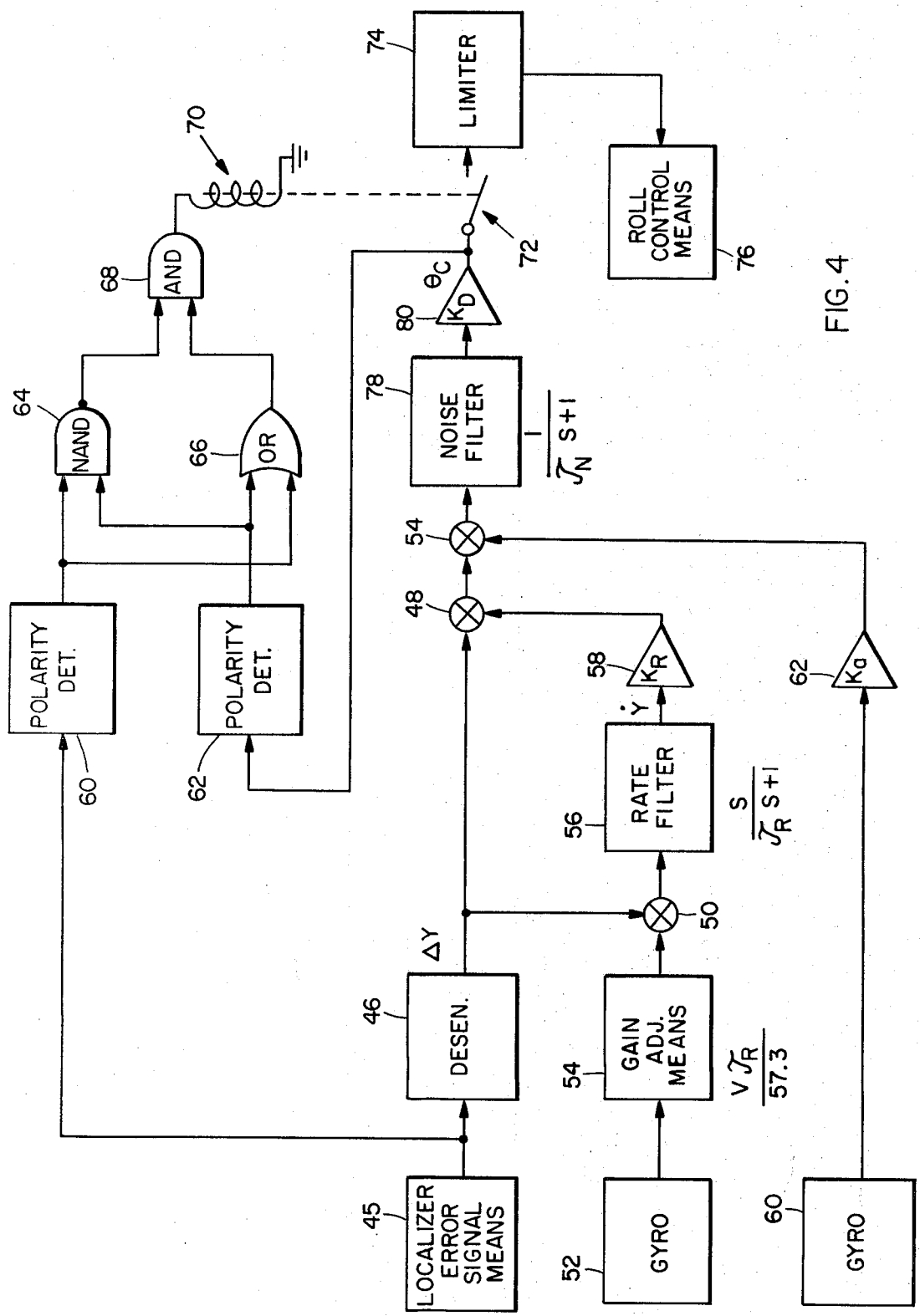
FIG. 4 is a block diagram showing an on-board system for controlling the lateral flight of the craft.

With reference now to FIG. 4, a signal from a localizer beam error signal means 45 is applied to a conventional type signal desensitizer 46 which provides a signal $\Delta y$ proportional to the change in heading of the aircraft. Signal $\Delta y$ is applied to a summing means 48 and to a summing means 50.

A gyro 52 provides a heading error signal which is applied to a gain adjusting means 54 having a constant gain $\nu \tau_R/57.3$ and derived in a manner as will be hereinafter explained. The signal from gain adjusting means 54 is applied to summing means 50 and summed thereby with signal $\Delta y$ from desensitizer 46.

The signal from summing means 50 is applied to a rate filter 56 having a transfer function $S/\tau_R S + 1$. Filter 56 provides a signal $y$ corresponding to heading rate. Signal $y$ from rate filter 56 us applied to an amplifier 58 having a constant gain $K_R$. The signal from amplifier 58 is applied to summing means 48 and summed thereby with signal $\Delta y$ from desensitizer 46.

A gyro 60 provides a roll attitude signal which is applied to an amplifier 62 having a constant gain $K_A$. The signal from amplifier 52 is applied to a summing means 55 and summed thereby with the signal from summing means 48.

In this connection, it is assumed that aircraft 1 is in a coordinated turn and therefore the lateral acceleration of the craft equals zero. If it is considered that the sideslip angle is negligible, then heading rate is equal to roll angle. In this sense the signal from gyro 60 is inertially referenced and is the inertial signal heretofore referenced to.

The signal from summing means 55 is applied to a noise filter 78 having a transfer function $1/\tau_N S + 1$. The signal from noise filter 24 is applied to an amplifier 80 having a constant gain $K_D$. Amplifier 80 provides a lateral steering signal $\phi_c$.

The signal from localizer error signal means 45 is applied to a conventional polarity detector 60 and the signal from amplifier 58 is applied to a like polarity detector 62. The signal from polarity detector 60 is applied to a NAND gate 64 and an OR gate 66. The signal from polarity detector 62 is applied to NAND gate 64 and OR gate 66. Gates 64, 66 and 68 operate as an "exclusive OR" combination as do gates 32, 34, 36 in FIG. 3 so that when the polarity of signal $\phi_c$ as compared to the polarity of the signal from localizer error signal means 45 is such as to cause aircraft 1 to fly parallel to the beam, gate 62 provides a signal which energizes a relay 70 connected by suitable mechanical means to a normally open switch 72. Energized relay 70 closes switch 72 to connect amplifier 58 to a signal limiter 74.

The signal from limiter 74 is applied to a roll control means 76 which may include a conventional servo system with control surface feedback means for controlling the aircraft about the roll axis.

OPERATION

Figure 1:
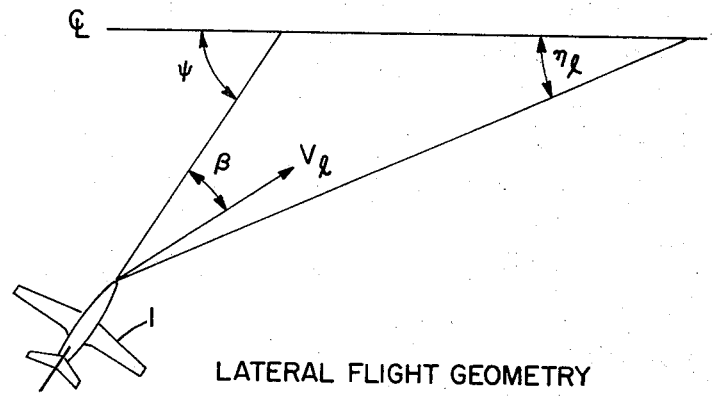
FIG. 1 is a diagrammatic representation showing lateral flight geometry.

The operation of the invention may be best described with reference to the flight geometry representations of FIGS. 1 and 2.

Referring first to FIG. 2, from geometrical considerations for the longitudinal axis it will be seen that glideslope beam error $\eta_p$ is a function of altitude $h$ and range $R$ plus the glideslope angle which is the angle from the beam centerline to the horizontal and is approximately 2.75°. This relationship may be expressed as follows:

$$\eta_p = 57.3 (h/R) - 2.75.$$

1

Differentiating to obtain beam rate, the following expressions are obtained:

$$\dot{\eta}_p = 57.3 \, dh/R - 57.3 \, h \, dR/R^2$$
$$\dot{\eta}_p = 57.3 \, \dot{h}/R - 57.3 \, hv/R^2$$
$$\dot{\eta}_p = 57.3 \, \dot{h}/R - V/R \, (\eta_p + 2.75)$$

2 where $V$ is the velocity of aircraft 1.

Beam acceleration $\ddot{\eta}_p$ is obtained by again differentiating and is expressed as follows:

$$\ddot{\eta} = 1/R \, (57.3 \, \ddot{h} - 2V\dot{\eta}_p - \eta_p \, \dot{V}_p - 2.75 \, \dot{V}_p).$$

Assuming that $\dot{V}$ (forward acceleration) is negligible the following equation for beam acceleration results:

$$\ddot{\eta} = 1/R \, (57.3\ddot{h} - 2 \, V_p \, \dot{\eta}_p).$$

3

Equation 3 shows that beam acceleration ($\ddot{\eta}_p$) is dependent only on vertical acceleration and beam error rate. If the output ($A_N$) of normal accelerometer 20 (FIG. 3) is used to approximate vertical acceleration, the following equation results:

$$\ddot{\eta}_p = 57.3 \, A_N/R - 2V/R \, \dot{\eta}_p.$$

4

An equation for steering signal $\theta_c$ which will result in an exponential maneuver may be stated as follows:

$$\theta_c = (\tau_c \, S + 1) \, K_D \eta_p$$

5 i.e., this represents a rate damped beam error feedback system.

In equation 5, $\tau_c$ is the beam capture time constant. An equivalent signal may be synthesized by multiplying numerator and denominator by a filter time constant $\tau_N$ as follows:

$$\theta_c = (\tau_N \tau_c \dddot{\eta}_p + (\tau_N + \tau_c) \ddot{\eta}_p + \eta_p) \cdot K_D / \tau_{NF} S + 1 \qquad 6$$

If equation 4 is substituted in equation 6 the following relationship results.

$$\theta_c = 57.3 \tau_N \tau_c \, A_N / R + (\tau_N + \tau_c - 2 V \tau_N \tau_c / R) \, \dot{\eta}_p + \eta_p / \tau_N + 1 \qquad 7$$

Gain factors $K_A$ and $K_R$ in FIG. 3 may be defined by the following equations:

$$K_A = K_D \, 57.3 \, \tau_N \, \tau_c / R \qquad 8$$

$$K_R = (\tau_N + \tau_c - 2 \, V \tau_N \, \tau_c / R) \, K_D \qquad 9$$

If some form of range desensitizing is available, the above gains may be reduced to constants. In order to provide even further beam noise immunity, the following approximations are made for high frequencies:

$$\Delta \alpha \approx 0 \text{ and}$$
$$\Delta \dot{h} = V (\Delta \theta - \Delta \alpha)/57.3 \approx V (\Delta \theta)/57.3 \qquad 10$$

Thus, a second filtering network is set up. This will provide for maximum filtering of noise during the capture mode. System engage occurs i.e. switch 72 is closed, when the filtered steering signal ($\theta_c$) has a polarity so as to cause the aircraft to fly parallel to the beam. The resulting path which the aircraft will follow will be an exponential path with respect to the beam, and will be symmetrical with respect to beam center.

With reference to the flight geometry representations of FIG. 1 for the lateral axis and to the block diagram of FIG. 4, similar equations may be set up with respect to lateral beam deviations as follows:

$$\dot{\eta}_l = 1/R \, (57.3 \, \dot{\gamma} - V \eta_l) \qquad 11$$

$$\ddot{\eta}_l = 1/R \, [57.3 \, \ddot{\gamma} - 2 \, V \dot{\eta}_l] \qquad 12$$

If small angle approximations are utilized, and the slideslip angle is assumed small, then the following equations results:

$$\dot{\gamma} = - V_l \, \psi / 57.3 \qquad 13$$

Assuming that the turns will be coordinated $$\dot{\gamma} = g \, \phi / 57.3 \qquad 14$$

It will now be understood that sufficient time must be available for filters 12 and 24 in FIG. 3 and filters 55 and 56 in FIG. 4 to reach initial conditions prior to beam capture engagement as provided by switches 40 and 72. It is noted that if engagement occurs early, beam capture may still be successful if the initial error has been updated by the end of the capture maneuver.

Sufficient time must also be available for the system to accustom itself to gusts which change the angle of attack or sideslip. For wind shears, there is likely to be an error involved in the beam capture maneuver, but this error will be within the limits of acceptable performance. It can also be shown that owing to the time length of the capture maneuver and the conditions under which it occurs, wind shears of appreciable magnitude are unlikely.

Analysis of the systems disclosed show that acceptable performance may be obtained by setting the beam rate time constant $\tau_R$ at approximately one-third of the beam capture time constant $\tau_c$. The beam noise filter time constant $\tau_N$ should also be set at one-third the capture time constant $\tau_c$ or less.

Although but several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for controlling an aircraft in response to radio beams, comprising:
   means for providing a glidescope beam error signal;
   means for providing an aircraft pitch attitude rate signal;
   means for providing a normal acceleration signal;
   means for combining the beam error, attitude rate and normal acceleration signals;
   means for filtering the combined signal;
   means connected to the filter for controlling the craft in response to the filtered combined signal;
   normally open switching means connected to the filter and to the controlling means;
   a first polarity detector connected to the filter;
   a second polarity detector connected to the glidescope beam error signal means; and
   comparing means connected to the first and second polarity detectors and to the normally open switching means and effective for closing said switching means to apply the filtered signal to the control means when the polarity of the filtered signal as compared to the polarity of the glidescope beam error signal causes the aircraft to fly parallel to the beam.

2. A system as described by claim 1, wherein the comparing means is an exclusive OR gate.

3. A system as described by claim 2, wherein the exclusive OR gate includes:
   a NAND gate connected to the first and second polarity detectors;
   an OR gate connected to the first and second polarity detectors;
   the NAND and OR gates providing signals in accordance with the comparative polarities of the filtered signal and the glideslope beam error signal;

an AND gate connected to the NAND and OR gates and responsive to the signals therefrom for providing a signal when the comparative polarities of the filtered signal and the glideslope beam error signal cause the craft to fly parallel to the beam; and the normally open switching means connected to the AND gate and closed by the signal therefrom.

4. A system as described by claim 1, wherein the means for providing the pitch attitude rate signal includes:

means for providing a pitch attitude signal;

means for combining the pitch attitude signal and the glideslope beam error signal; and means for filtering the combined signal to provide the pitch attitude rate signal.

5. A system as described by claim 1, wherein the combining means includes:

first means for combining the glidescope beam error and pitch attitude rate signals; and second means for combining the signal from the first means and the normal acceleration signal.

6. A system as described by claim 1, including:

means for desensitizing the glideslope beam error signal; and the combining means combining the desensitized, pitch attitude rate and normal acceleration signals.

7. A system as described by claim 1, including:

means connected to the filtering means for limiting the filtered signal; and the controlling means connected to the limiting means for controlling the craft in response to the limited signal.

8. A system for controlling an aircraft in response to the radio beams, comprising:

means for providing a localizer beam error signal;

means for providing an aircraft heading attitude rate signal;

means for providing a roll attitude signal;

means for combining the beam error, attitude rate and roll attitude signals;

means for filtering the combined signals;

means connected to the filter for controlling the craft in response to the filtered combined signal;

normally open switching means connected to the filter and to the controlling means;

a first polarity detector connected to the filter;

a second polarity detector connected to the localizer beam error signal means; and comparing means connected to the first and second polarity detectors and to the normally open switching means and effective for closing said switching means to apply the filtered signal to the control means when the polarity of the filtered signal as compared to the polarity of the localizer beam error signal causes the aircraft to fly parallel to the beam.

9. A system as described by claim 8, wherein the comparing means is an exclusive OR gate.

10. A system as described by claim 9, wherein the exclusive OR gate includes:

a NAND gate connected to the first and second polarity detectors;

a OR gate connected to the first and second polarity detectors;

the NAND and OR gates providing signals in accordance with the comparative polarities of the filtered signal and the localizer beam error signal;

an AND gate connected to the NAND and OR gates and responsive to the signals therefrom for providing a signal when the comparative polarities of the filtered signal and the localizer beam error signal cause the craft to fly parallel to the beam; and the normally open switching means connected to the AND gate and closed by the signal therefrom.

11. A system as described by claim 8, wherein the means for providing the heading attitude rate signal includes:

means for providing a heading attitude signal;

means for combining the heading attitude signal and the localizer beam error signal; and means for filtering the combined signal to provide the heading attitude rate signal.

12. A system as described by claim 8, wherein the combining means includes:

first means for combining the localizer beam error and heading attitude rate signals; and second means for combining the signal from the first means and the roll attitude signal.

13. A system as described by claim 8, including:

means for desensitizing the localizer beam error signal; and the combining means combining the desensitized, heading attitude rate and roll atitude signals.

14. A system as described by claim 8, including:

means connected to the filtering means for limiting the filtered signal; and the controlling means connected to the limiting means for controlling the craft in response to the limited signal.

* * * * *